(12) United States Patent
Suonvieri

(10) Patent No.: US 6,768,897 B1
(45) Date of Patent: Jul. 27, 2004

(54) METHOD OF ADJUSTING FREQUENCY OF CELLULAR RADIO REPEATER

(75) Inventor: Jukka Suonvieri, Tampere (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/509,578

(22) PCT Filed: Sep. 30, 1998

(86) PCT No.: PCT/FI98/00775

§ 371 (c)(1),
(2), (4) Date: Jun. 15, 2000

(87) PCT Pub. No.: WO99/17476

PCT Pub. Date: Apr. 8, 1999

(30) Foreign Application Priority Data

Sep. 30, 1997 (FI) .................................................. 973850

(51) Int. Cl.[7] ............................ H04B 3/36; H04B 7/14; H04B 17/00; H04B 1/60; H04B 17/02; H04B 7/15

(52) U.S. Cl. ............................... 455/15; 455/9; 455/10; 455/11.1; 455/67.11; 455/423

(58) Field of Search ........................... 455/11.1, 15, 16, 455/421, 422, 423, 424, 9, 10, 67.11

(56) References Cited

U.S. PATENT DOCUMENTS

| | | | |
|---|---|---|---|
| 5,125,102 A | | 6/1992 | Childress et al. |
| 5,133,080 A | * | 7/1992 | Borras ............................ 455/9 |
| 5,179,720 A | | 1/1993 | Grube et al. |
| 5,548,803 A | | 8/1996 | Evans |
| 5,574,788 A | | 11/1996 | Childress et al. |
| 5,590,133 A | * | 12/1996 | Billstrom et al. ........... 370/349 |
| 5,634,191 A | * | 5/1997 | Beasley ....................... 370/279 |
| 5,809,398 A | * | 9/1998 | Moberg et al. ............... 455/17 |
| 5,812,933 A | * | 9/1998 | Niki ............................. 455/16 |
| 5,815,795 A | * | 9/1998 | Iwai .............................. 455/9 |
| 5,857,144 A | * | 1/1999 | Mangum et al. ........... 455/11.1 |
| 5,930,297 A | * | 7/1999 | Kaewell et al. ............. 375/260 |
| 6,005,884 A | * | 12/1999 | Cook et al. .................. 375/132 |
| 6,459,881 B1 | * | 10/2002 | Hoder et al. ............... 455/11.1 |

FOREIGN PATENT DOCUMENTS

| | | |
|---|---|---|
| GB | 2 242 337 A | 9/1991 |
| WO | 98/25421 | 6/1998 |

* cited by examiner

Primary Examiner—Simon Nguyen
(74) Attorney, Agent, or Firm—Pillsbury Winthrop LLP

(57) ABSTRACT

The invention relates to a method of adjusting the radio frequency of a repeater (302) in a cellular radio network. The repeater (302) amplifies radio signals (170) of a bi-directional radio connection between a base station (100) and a subscriber terminal (150) at least at one particular radio frequency. In accordance with the invention, the repeater (302) monitors the radio signals (170) transmitted by at least one base station (100). The repeater (302) automatically tunes to amplify the signals (170) of the particular radio frequency on the basis of information included in the radio signals (170) it has monitored. The monitored radio signals (170) include a control channel, for example a broadcast control channel BCCH, comprising information on the operating frequencies of the base station (100). Monitoring means (404) are preferably similar to a subscriber terminal (150).

5 Claims, 4 Drawing Sheets

METHOD OF ADJUSTING FREQUENCY OF CELLULAR RADIO REPEATER

FIELD OF THE INVENTION

The invention relates to a method of adjusting the radio frequency of a repeater in a cellular radio network, the repeater amplifying radio signals of a bi-directional radio connection between a base station and a subscriber terminal at least at one particular radio frequency.

BACKGROUND OF THE INVENTION

Cellular radio networks use repeaters for covering shadow regions of a base station. The shadow regions are caused by difficult terrain conditions, including mountains, buildings and tunnels. The repeater advantageously improves the quality of a radio connection between the base station and the subscriber terminal, since the acquisition and operating costs of the repeater, being simpler in structure, are lower than those of the actual base station. The repeater, as compared with the base station, provides a considerable saving particularly in telecommunication connections, because it does not need expensive fixed transmission capacity which is required between the base station and a base station controller.

The repeaters are most commonly used in road tunnels, underground stations, car parks and other similar locations under ground from where it is difficult or impossible to implement a direct radio connection to the base station. The use of the repeaters is more difficult in an open terrain, because a radio signal propagates over two paths between the base station and the subscriber terminal: directly and via the repeater. This brings about interference in the form of multipath-propagated signal components to the received signal.

The repeater thus amplifies the signals of a base station that operates at a particular frequency. Each repeater must be adjusted to amplify radio frequencies used by a particular base station. When a large number of repeaters is involved, adjusting them to the correct frequency becomes a laborious task that is prone to errors. Typically, a network administrator must perform frequency changes in the network in connection with the extension, increase of capacity and tuning of the network. When frequencies are reallocated, the repeaters within the area of each base station must also be modified to use the radio frequencies in accordance with a new frequency plan, for the repeaters are channel selective and must therefore be configured to use the desired frequencies. Broadband repeaters which do not need to be tuned to the desired frequency are also known in the field.

In the prior art, the repeaters are manually adjusted to use the desired frequencies. In that case, a person in charge of maintenance travels to each repeater and adjusts, either mechanically or via a computer that is connected to the serial port of the repeater, the frequencies used by the repeater. In another approach, the person in charge of maintenance adjusts the frequencies by manual remote control. In that case, the repeater is arranged to receive information on the correct frequency by a radio modem, for example. The radio modem may be a conventional GSM telephone, for example, with a modem card connected thereto. The repeater may also be arranged to receive information on the correct frequencies via a shortmessage service, in which case a GSM telephone is also connected to the repeater.

However, a problem in the above-mentioned arrangements is that they are manual operations involving extra work and being also extremely prone to errors.

BRIEF DESCRIPTION OF THE INVENTION

An object of the invention is thus to provide a method and equipment implementing the method so as to solve the above-mentioned problems. This is achieved by the method of the type presented in the introduction, which is characterized in that the repeater monitors the radio signals transmitted by at least one base station and automatically tunes to amplify the signals of the particular radio frequency on the basis of the information included in the radio signals it has monitored.

The invention also relates to a repeater in a cellular radio network, amplifying radio signals of a bi-directional radio connection between a base station and a subscriber terminal at least at one particular radio frequency.

The repeater of the invention is characterized in that the repeater comprises monitoring means for monitoring the radio signals transmitted by at least one base station, and adjustment means for automatically tuning to amplify the radio signals of a particular radio frequency on the basis of the information included in the radio signals it has monitored.

The preferred embodiments of the invention are disclosed in the dependent claims.

The invention is based on the idea that no special measures need be taken in order to change the frequencies amplified by a repeater. The repeater monitors information that is even normally transmitted by a base station, and concludes the frequency at which it should operate on the basis of the information.

The method and system of the invention provide many advantages. A person in charge of maintenance does not need to take any measures in order to set the frequencies used by the repeater. The work contribution previously required in order to accomplish the task is no longer needed. In addition, the risk of committing errors becomes considerably smaller. As compared with the prior art manual remote control, the solution of the invention does not involve extra costs.

BRIEF DESCRIPTION OF THE DRAWINGS

In the following, the invention will be described in more detail by means of preferred embodiments with reference to the accompanying drawings, in which.

DETAILED DESCRIPTION OF THE INVENTION

Figure 1:
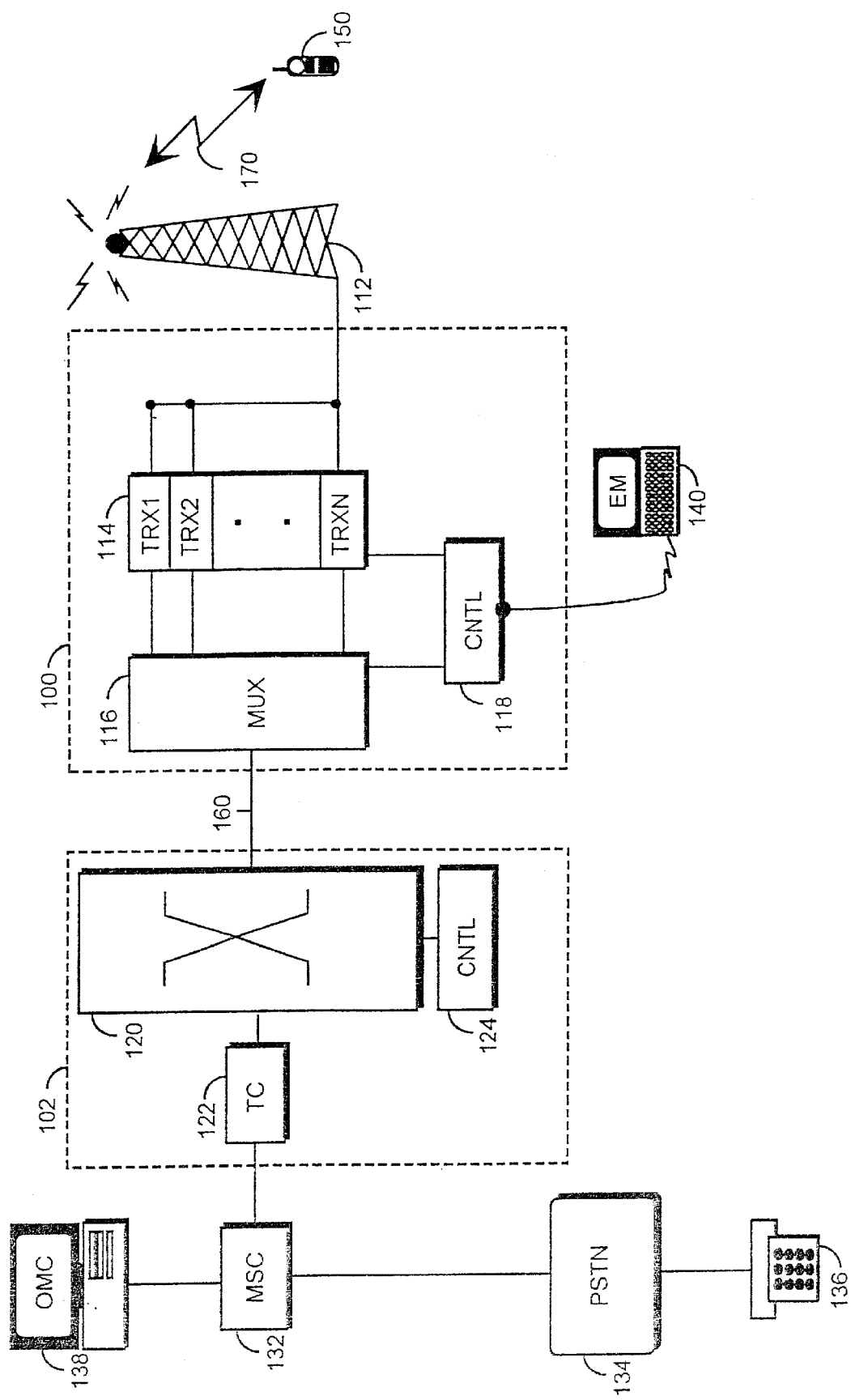
FIG. 1 shows the structure of a cellular radio network.

FIG. 1 shows a typical structure of a cellular radio network of the invention. Only blocks essential to the description of the invention are included in FIG. 1, but it is obvious to those skilled in the art that a conventional cellular radio network also comprises other operations and structures which do not need to be described in more detail in this context. The examples show a digital mobile telephone system using TDMA (Time Division Multiple Access), but the invention is suitable for use in all types of cellular radio networks using channel selective repeaters, in different types of hybrid systems, for example, and also in analog radio systems.

A cellular radio network typically comprises a fixed network infrastructure, i.e. a network part, and subscriber terminals 150 that may be fixedly placed, vehicle-mounted or portable hand-held terminal equipments. The network part includes base stations 100. Several base stations 100 are controlled in a centralized manner by a base station controller 102 communicating with them. The base station 100 comprises transceivers 114. Typically, the base station 100 comprises 1 to 16 transceivers 114. In TDMA systems, for example, one transceiver 114 provides radio capacity for one TDMA frame, in other words, typically for eight time slots.

The base station 100 comprises a control unit 118 controlling the operation of the transceivers 114 and a multiplexer 116. The multiplexer 116 assigns traffic channels and control channels used by several transceivers 114 to one transmission link 160.

The base station 100 transceivers 114 communicate with an antenna unit 112 that implements a bi-directional radio connection 170 to the subscriber terminal 150. The structure of the frames to be transmitted on the bi-directional radio connection 170, which is called an air interface, is accurately defined.

Figure 2:
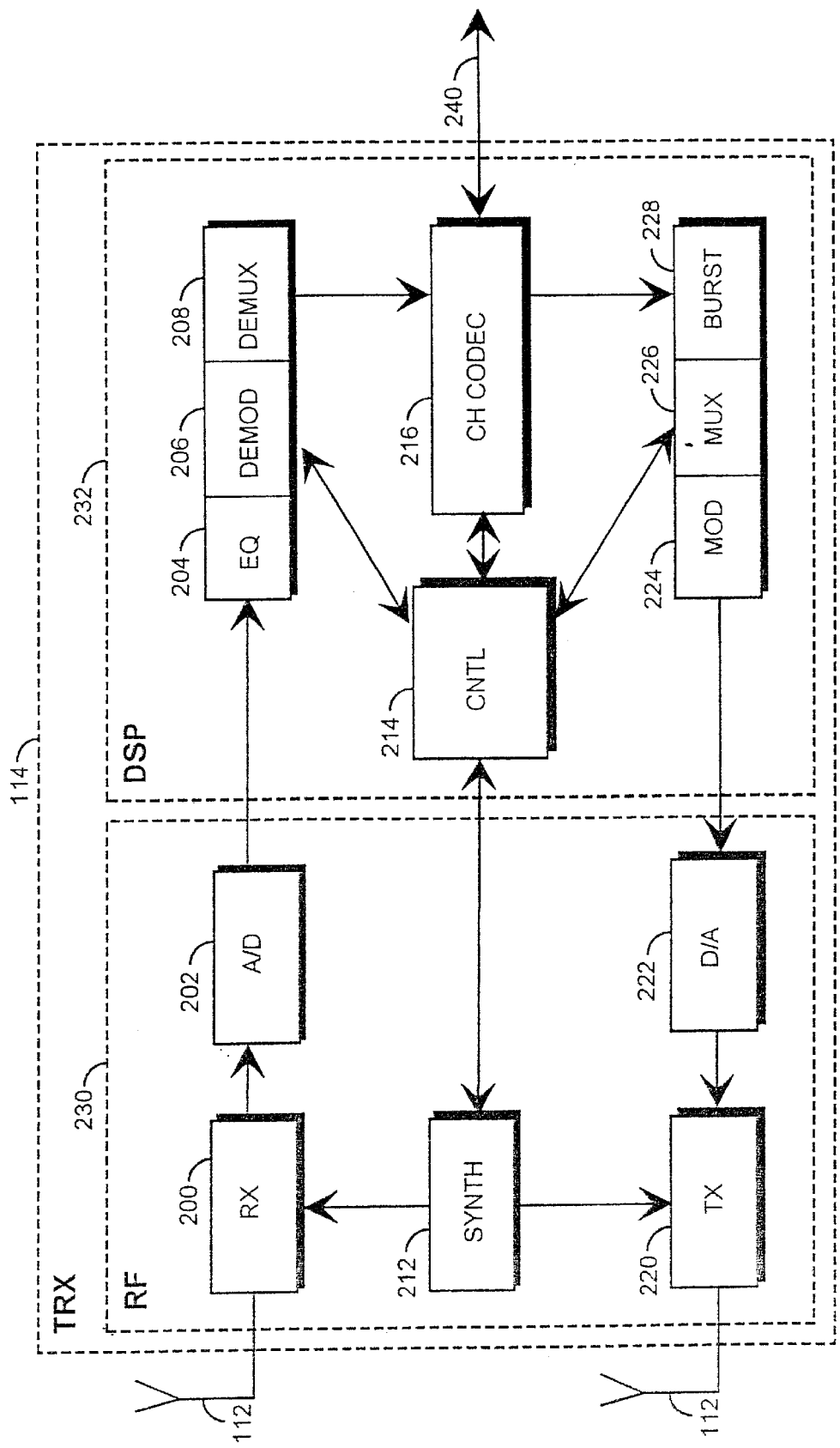
FIG. 2 shows the structure of a transceiver.

FIG. 2 gives a more detailed description of the structure of a transceiver 114. A receiver 200 comprises a filter that blocks frequencies beyond the desired frequency band. Next, a signal is converted into an intermediate frequency or directly to a baseband, after which the signal is sampled and quantized in an analog-to-digital converter 202. An equalizer 204 compensates for interference caused by multipath propagation, for example. A demodulator 206 extracts a bit stream from the equalized signal, and the bit stream is transmitted to a demultiplexer 208. The demultiplexer 208 demultiplexes the bit stream from different time slots into distinct logical channels. A channel codec 216 decodes the bit stream of the distinct logical channels, in other words, it concludes whether the bit stream consists of signalling information to be transmitted to a control unit 214, or whether it is speech to be transmitted 240 to a speech codec 122 of the base station controller 102. The channel codec 216 also carries out error correction. The control unit 214 carries out internal control tasks by controlling different units. A burst generator 228 adds a training sequence and a tail to the data coming from the channel codec 216. A multiplexer 226 assigns a specific time slot to each burst. A modulator 224 modulates digital signals to a radio frequency carrier. This is an analog operation required to be executed by a digital-to-analog converter 222. A transmitter 220 comprises a filter for narrowing down the bandwidth. Furthermore, the transmitter 220 controls transmission output power. A synthesizer 212 generates the required frequencies for different units. The synthesizer 212 includes a clock that can be controlled locally or in a centralized manner from elsewhere, from the base station controller 102, for example. The synthesizer 212 generates the required frequencies by a voltage-controlled oscillator, for example.

The structure of the transceiver can be further divided in the manner presented in FIG. 2 into radio frequency parts 230 and into a digital signal processor including software 232. The radio frequency parts 230 include the receiver 200, the analog-to-digital converter 202, the digital-to-analog converter 222, the transmitter 220, and the synthesizer 212. The digital signal processor including software 232 includes the equalizer 204, the demodulator 206, the demultiplexer 208, the channel codec 216, the control unit 214, the burst generator 228, the multiplexer 226, and the modulator 224.

The base station controller 102 comprises a group switching field 120, a transcoder 122 and a control unit 124. The group switching field 120 is used for speech and data switching and for connecting signalling circuits. The transcoder 122 converts different digital speech coding formats used between the public switched telephone network and the radio telephone network so that they are suitable for one another, for example from the 64 kbit/s format of the fixed network to some other format (for example 13 kbit/s), and vice versa. The control unit 124 carries out call control, mobility management, gathering of statistical information, and signalling.

In the example of FIG. 1, a connection is established via a mobile services switching centre 132 from the subscriber terminal 150 to a telephone 136 connected to a PSTN 134 (Public Switched Telephone Network).

An OMC (Operations and Maintenance Centre) controlling and monitoring the operation of the radio telephone system communicates with the mobile services switching centre 132. The OMC 132 is typically a relatively powerful computer including special software. The control may also focus on individual parts of the system, since data transmission connections between different parts of the system can be provided with control channels required for transmitting control information.

In addition, the personnel installing the network and monitoring its use can utilize for example a portable computer including management software 140 (EM=Element Manager) for management of individual network elements. In the example of the figure, the device 140 is connected to a data transmission port in the control unit 118 of the base station 100 and it can monitor and control the operation of the base station 100. It can examine and change the values of the parameters that control the operation of the base station, for example.

Figure 3:
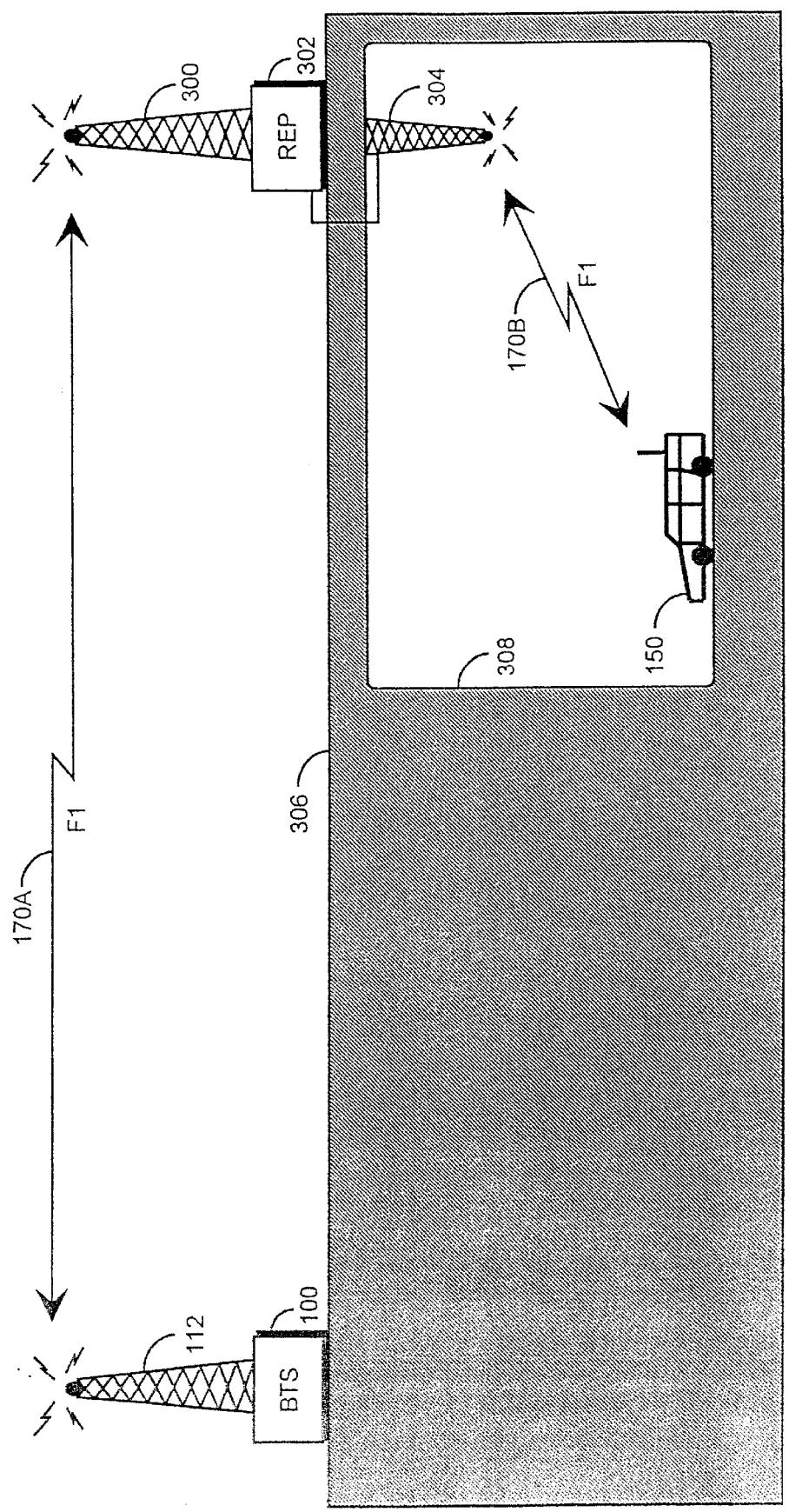
FIG. 3 illustrates the use of a repeater.

FIG. 3 shows an example illustrating the use of a repeater. A repeater 302 is located within the coverage area of the base station 100. The repeater 302 uses an antenna 300 above ground level 306 for receiving a radio signal 170A transmitted by the base station 100 via an antenna 112. The repeater 302 amplifies the received radio signal 170A and transmits, via an antenna 304 that is located in a car park 308 under the ground level 306, an amplified radio signal 170B to the subscriber terminal 150 placed inside a parked car. The repeater 302 operates bi-directionally, i.e. the radio signal 170B received from the subscriber terminal 150 is also amplified, and the amplified radio signal 170A is transmitted to the base station 100. The repeater 302 and the base station 100 operate at the same radio frequencies, which is illustrated in FIG. 3 by F1 indicating the radio frequency used by the radio signals 170A, 170B.

Figure 4:
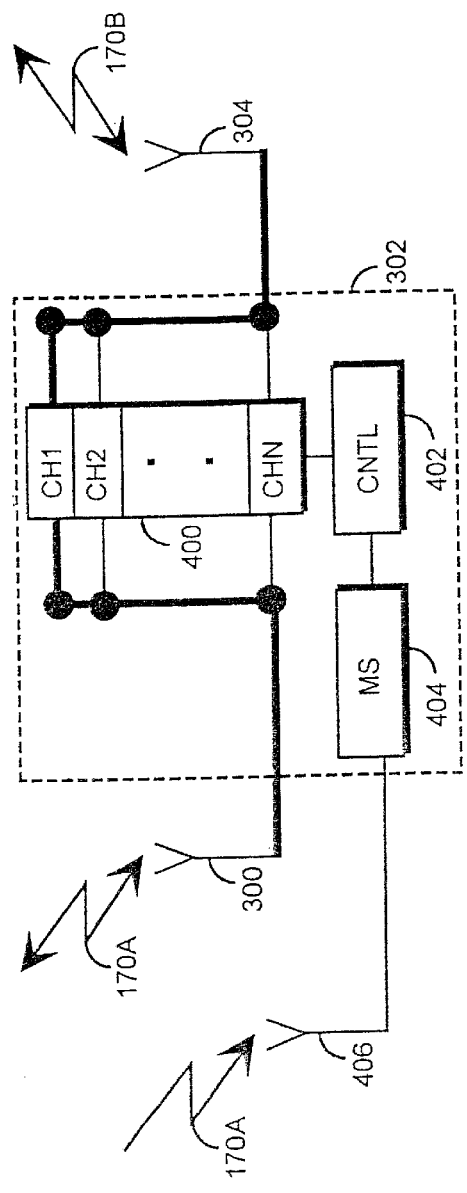
FIG. 4 shows the structure of a repeater of the invention.

FIG. 4 gives a more detailed picture of the essential parts of the structure of the repeater 302 of the invention. The repeater 302 has 1 to N channel units 400, each being able to amplify radio traffic propagating via one base station 100 transceiver 114 in both transmission directions. Each channel unit 400 communicates with two antennas, the first antenna 300 being required for the radio connection 170A with the base station 100, and the second antenna being required for the radio connection 170B with the subscriber terminal 150. The operation of each channel unit 400 is controlled by a control unit. The bold line in FIG. 4 illustrates the propagation of one connection through the repeater 400.

Figure 5:
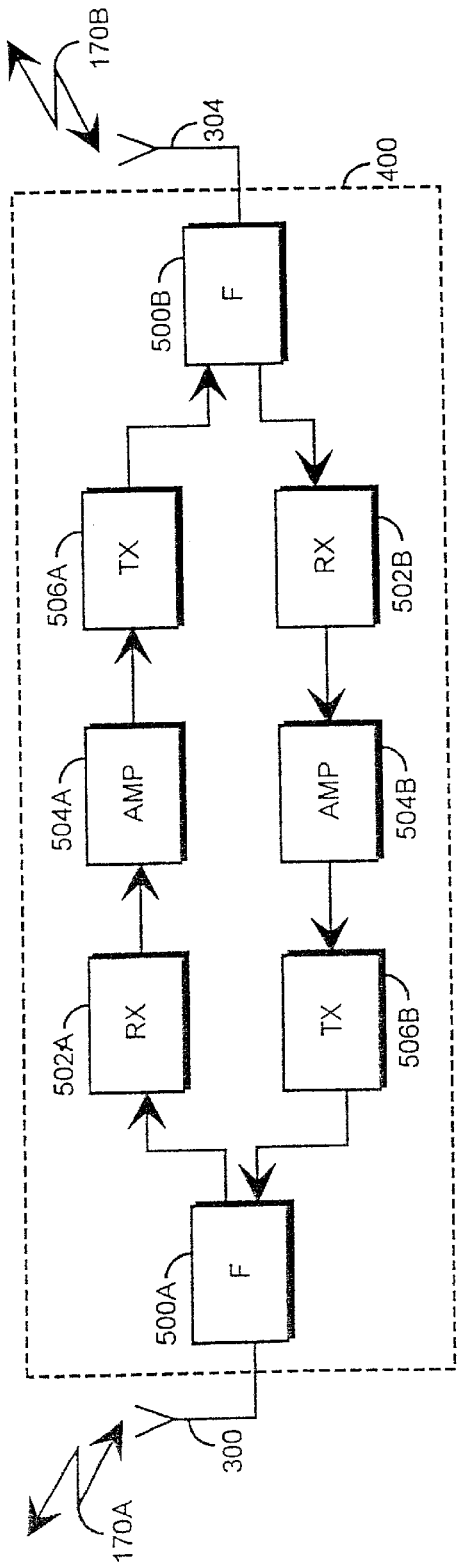
FIG. 5 shows the structure of a channel unit of a repeater.

FIG. 5 gives a more detailed picture of the structure of the channel unit 400. The channel unit 400 comprises two reception-transmission branches. A duplex filter 500A separating the transmission and reception frequencies from one another is located after the antenna 300 that provides the radio connection 170A to the base station 100. The upper reception-transmission branch shown in FIG. 5 is composed of a receiver 502A, a power amplifier 504A and a transmitter 506A. Next there is a duplex filter 500B separating the transmission and reception frequencies from one another in an antenna 304 that provides the radio connection 170B to the subscriber terminal. The lower reception-transmission branch is composed of, similarly to the upper reception branch, a receiver 502B, a power amplifier 504B and a transmitter 506B. Configured as in the example of FIG. 5, the channel unit 400 thus receives, amplifies and transmits, using the upper branch, the signal 170A received from the base station 100 and performs, using the lower branch, the corresponding procedures to the signal 170 received from the subscriber terminal 150.

The number of channel units 400 depends on the required traffic capacity within the area covered by the repeater 302. FIG. 4 shows N channel units, although considerably fewer units may be used; radio repeaters 302 with one or two channel units 400 are used for covering low capacity areas.

Having described a typical structure of a cellular radio network, a typical operating situation of a repeater 302 and an example of the structure of the repeater 302, let us next study the operation of the invention. As already mentioned above, a major problem associated with the repeater 302 is how to configure it to use the same frequencies as the base station 100. This is a problem particularly in commissioning the network and, after the commissioning, each time modifications or extensions are made to the network to change the frequency planning of the network.

FIG. 3 described how the base station 100 uses the frequency F1 for its traffic. In practice, more frequencies are used, but for the sake of clarity of the example, the description is limited to only one frequency. Let us also study FIG. 4 showing that the repeater 302 comprises monitoring means 404 for monitoring the radio signals 170A transmitted by at least one base station. The radio signals 170A monitored by the repeater 302 comprise a control channel including information on the operating frequencies of the base station 100. In other words, this information is not intended for adjusting the frequencies of the repeater 302 as such, but it is system information of the cellular radio network, transmitted to the subscriber terminals 150 as broadcasts to control the operation of the terminals. One of the control channels including information on the operating frequencies of the base station 100 is a broadcast control channel BCCH. In the GSM 900 system, for example, the frequency information is transmitted as coded into a cell allocation table including information on 124 frequencies in 16 octets, the use of the frequency by the base station 100 being indicated by the on/off state of a single bit.

The list also includes a base station identity code BSIC identifying the base station 100. The repeater 302 identifies the correct frequencies on the basis of the BSIC, for information is set in the repeater 302 on the base station 100 whose frequencies it has to repeat. In other words, the repeater 302 monitors a predetermined base station 100. If the BSIC of the base station 100 is changed, the same change must also be made to the repeater 302 by manual remote control, for example. Another alternative is that the repeater 302 monitors the base station 100 of the correct operator with the best audibility and tunes to repeat its frequencies.

In accordance with the examples of FIGS. 3 and 4, the repeater 302 thus uses the monitoring means 404 for receiving the control channel signals 170A transmitted by the base station 100. It is possible to process the control channel signals 170A in two ways: they can be processed either in the monitoring means 404 or they can be transmitted to adjustment means 402 for processing. In processing, information on the frequency or frequencies at which the repeater 302 has to operate is decoded from the control channel signals 170A. In accordance with the example of FIG. 3, the control channel signals 170A indicate that the repeater 302 must operate at the frequency F1. Next, the adjustment means 402 adjust the channel units 400 of the repeater 302 to repeat the signals at the frequency F1.

In practice, there are more frequencies that are repeated in use but only the frequencies that have changed are changed in channel units 400. The frequencies that remain unchanged do not need to be changed.

The invention is preferably so implemented that the monitoring means 404 are similar to a conventional subscriber terminal equipment 150. Depending on the type of the subscriber terminal 150, slight modifications may be necessary so that the required information can be transmitted from the monitoring means 404 to the adjustment means 402.

A conventional GSM telephone is locked into the base station 100 of the correct operator with the best audibility, and, consequently, if it is desired that the telephone is locked into a particular base station 100, its operation must be somehow modified. Mobile telephone manufacturers typically provide their telephones with various test modes by means of which the desired property can be implemented easily.

The structure of the subscriber terminal 150 can be described by utilizing the description of the structure of the transceiver 114 of FIG. 2. The components of the subscriber terminal 150 are operationally the same as those of the transceiver 114. In addition, the subscriber terminal 150 comprises a duplex filter between the antenna 112, the receiver 200 and the transmitter 220, user interface parts and a speech codec. The speech codec is connected via a bus 240 to the channel codec 216. However, the speech codec and the user interface parts are not needed in the monitoring means 404 of the invention. It is essential that the monitoring means 404 comprise the radio frequency parts 230 for monitoring the control channels, and the digital signal processor including software 232, used for separating the information that is included in the control channels from the received signal 170A, and possibly for decoding it, and at least for transmitting it to the adjustment means 402 which can also carry out decoding of the information.

The invention is preferably implemented in the adjustment means 402 by software, whereby the invention requires relatively simple software modifications in an accurately specified section in the processor included in the adjustment means 402. The repeater 302 may also be so implemented that the adjustment means 402 are distributed to each channel unit 400, whereby the operation of the invention is also distributed to the adjustment means 402 located in the control units 400.

Although the invention is described above with reference to the example according to the accompanying drawings, it is obvious that the invention is not restricted thereto, but it can be modified in many ways within the scope of the inventive idea disclosed in the attached claims.

What is claimed is:

1. A method of adjusting the radio frequency of a repeater in a cellular radio network, the repeater being configured to amplify radio signals of a bi-directional radio connection between at least one base station and a subscriber terminal at least at one particular radio frequency, the method comprising:

monitoring the radio signals transmitted by the at least one base station;

automatically tuning to amplify signals of the particular radio frequency on the basis of information included in the radio signals; and monitoring a predetermined base station identified by a base station identity code, the monitored radio signals comprise a broadcast control channel including information on operating frequencies of the predetermined base station.

2. A method as claimed in claim 1, wherein the repeater does not change the radio frequency of the radio signals.

3. A repeater in a cellular radio network, the repeater being configured to amplify radio signals of a bi-directional radio connection between at least one base station and a subscriber terminal at least at one particular radio frequency, the repeater comprising:

a monitor for monitoring the radio signals transmitted by the at least one base station; and an adjuster for automatically tuning to amplify the radio signals of the particular radio frequency on the basis of information included in the radio signals, the monitor being configured to monitor a predetermined base station identified by a base station identity code, and the monitored radio signals comprising a broadcast control channel including information on operating frequencies of the predetermined base station.

4. A repeater as claimed in claim 3, wherein the monitor comprises substantially similar structure as the subscriber station equipment.

5. A repeater as claimed in claim 3 or 4, wherein the repeater does not change the radio frequency of the radio signals.

* * * * *